(12) United States Patent  (10) Patent No.: US 7,415,521 B2
Fruchtman  (45) Date of Patent: Aug. 19, 2008

(54) METHOD FOR CONTROLLING CLIENT ACCESS

(75) Inventor: Barry Fruchtman, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 848 days.

(21) Appl. No.: 10/815,318

(22) Filed: Mar. 31, 2004

(65) Prior Publication Data

US 2005/0246446 A1    Nov. 3, 2005

(51) Int. Cl.
    *G06F 15/173* (2006.01)

(52) U.S. Cl. ..................................... 709/227

(58) Field of Classification Search ............... 709/227, 709/223, 238
    See application file for complete search history.

(56) References Cited

U.S. PATENT DOCUMENTS

| | | | |
|---|---|---|---|
| 5,553,242 A | 9/1996 | Russell et al. | |
| 5,623,601 A | 4/1997 | Vu | |
| 5,642,515 A | 6/1997 | Jones et al. | |
| 5,696,898 A | 12/1997 | Baker et al. | |
| 5,708,780 A | 1/1998 | Levergood et al. | |
| 5,793,763 A * | 8/1998 | Mayes et al. | 370/389 |
| 5,944,823 A | 8/1999 | Jade et al. | |
| 6,076,108 A | 6/2000 | Courts et al. | |
| 6,088,728 A | 7/2000 | Bellemore et al. | |
| 6,094,485 A * | 7/2000 | Weinstein et al. | 380/30 |
| 6,219,706 B1 * | 4/2001 | Fan et al. | 709/225 |
| 6,480,894 B1 | 11/2002 | Courts et al. | |
| 6,502,192 B1 | 12/2002 | Nguyen | |
| 6,510,154 B1 * | 1/2003 | Mayes et al. | 370/389 |
| 6,587,880 B1 | 7/2003 | Saigo et al. | |
| 6,880,089 B1 * | 4/2005 | Bommareddy et al. | 726/11 |
| 7,228,412 B2 * | 6/2007 | Freed et al. | 713/153 |

* cited by examiner

*Primary Examiner*—David Y Eng
(74) *Attorney, Agent, or Firm*—Rabindramath Dutta; Konrad Raynes & Victor LLP

(57) ABSTRACT

Provided are a method, system, and article of manufacture, wherein in certain embodiments a request is received to initiate a session. A determination is made whether the session should be initiated with addressing information provided by a client. The session is initiated with trusted addressing information corresponding to the client, in response to determining that the session should not be initiated with the addressing information provided by the client.

8 Claims, 5 Drawing Sheets

METHOD FOR CONTROLLING CLIENT ACCESS

BACKGROUND

1. Field

The disclosure relates to a method, system, and article of manufacture for controlling client access.

2. Background

A firewall may be a system designed to prevent unauthorized access to or from a private network. Firewalls may be implemented either in hardware and software, or any combination thereof. A firewall may be used to prevent unauthorized clients from accessing a computer that is protected via the firewall. All messages entering or leaving the private network may pass through the firewall, which may examine each message and block those that do not meet a specified security criteria. A firewall may be considered a first line of defense in protecting private information within the private network. Firewalls may provide security for computers, devices, and other resources that are located inside the firewall from applications, networks, computers, devices, and other resources that are located outside the firewall.

A storage manager, such as, the Tivoli Storage Manager* product marketed by International Business Machines Corporation (IBM*), may be used in securely storing and backing up data. The storage manager may execute in a storage management server, and assure data integrity and provide the ability to protect business critical data in the event of hardware, software and environmental failures.

* Trivoli Storage Manager and IBM are trademarks of IBM corporation.

The storage manager server may be coupled to a plurality of data storage devices and other computational devices within a private network. A firewall may isolate a storage management server and the private network associated with the storage management server, from a plurality of clients that may be potentially allowed to access the storage management server.

SUMMARY OF THE DESCRIBED EMBODIMENTS

Provided are a method, system, and article of manufacture, wherein in certain embodiments a request is received to initiate a session. A determination is made whether the session should be initiated with addressing information provided by a client. The session is initiated with trusted addressing information corresponding to the client, in response to determining that the session should not be initiated with the addressing information provided by the client.

In additional embodiments, receiving the request, determining whether the session should be initiated, and initiating the session are performed by a storage manager implemented in a server from which the client is separated by a firewall. In further embodiments, the firewall prevents the client from initiating the session with the server.

In yet additional embodiments, the request indicates to a server that the client is ready to perform a task, and that the server should initiate the session with the client.

In further embodiments, the trusted addressing information corresponding to the client is received from a trusted administrative client, prior to receiving the request to initiate the session.

In further embodiments, the session is initiated with the addressing information provided by the client, in response to determining that the session should be initiated with the addressing information provided by the client.

In yet additional embodiments, the trusted addressing information is stored in a data structure, wherein the data structure includes for a plurality of clients whether each client of the plurality of clients is allowed to initiate sessions with client provided addressing information.

In certain embodiments, the trusted addressing information includes the Internet Protocol Address of the client.

In yet additional embodiments, a firewall prevents the client from initiating the session with a server, wherein the server is required to allow access to the client across the firewall.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Figure 1:
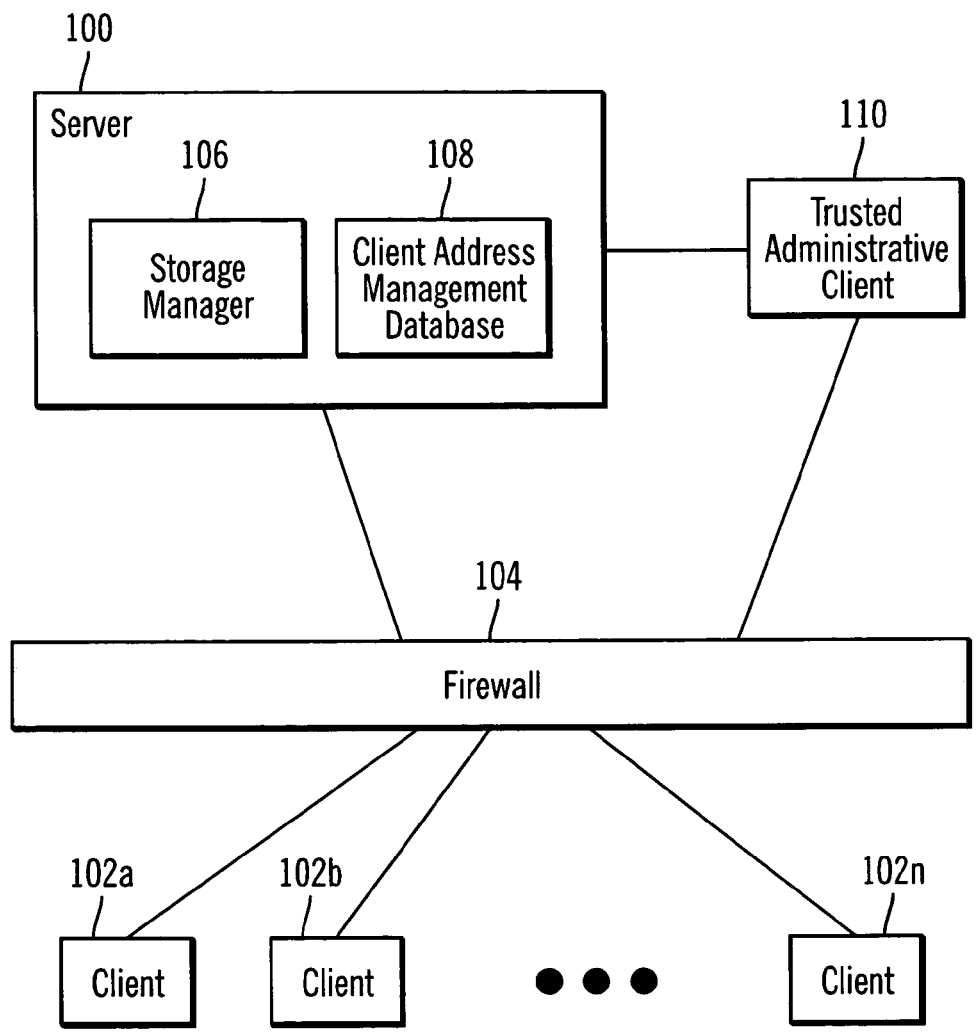
FIG. 1 illustrates a computing environment including a server, in accordance with certain embodiments.

FIG. 1 illustrates a computing environment in which certain embodiments are implemented. A server 100 and a plurality of clients 102$a$ ... 102$n$ are separated by a firewall 104, such that, commands and data that are transmitted between the server 100 and the clients 102$a$ ... 102$n$ pass through the firewall 104.

The server 100 and the clients 102$a$ ... 102$n$ may comprise any type of computational device, such as, a workstation, a desktop computer, a laptop, a mainframe, a telephony device, a hand held computer, etc. In certain embodiments, the server 100 may be coupled to any private network (not shown) known in the art, such as a Local Area Network (LAN), a Storage Area Network (SAN), etc., and may be isolated from a public network (not shown), such as, the Internet, via the firewall 104, where the clients 102$a$ ... 102$n$ may be coupled to the public network.

The server 100 includes a storage manager 106, such as, the Tivoli Storage Manager, and a database, such as, a client address management database 108. In certain embodiments, the storage manager 106 allows access to the clients 102$a$ ... 102$n$, such that, the clients 102$a$ ... 102$n$ may access data controlled by the storage manager 106, where the data is coupled to the server 100. The client address management database 108 includes client addressing information, such as, Internet Protocol (IP) addresses of the clients 102$a$ ... 102$n$. The storage manager 106 may use the client addressing information stored in the client address management database 108 to establish sessions with the clients 102$a$ ... 102$n$.

A trusted administrative client 110 that comprises a computational device is coupled to the server 100. In FIG. 1, the trusted administrative client 100 is not isolated from the server 100 via the firewall 104. In alternative embodiments, the trusted administrative client 100 may be isolated from the server 100 via the firewall 104 or via other firewalls. The trusted administrative client 110 may be administered by a system administrator and may include features that allow the trusted administrative client 100 to determine addressing information of the clients 102a ... 102n.

Therefore, FIG. 1 illustrates an embodiment in which the plurality of clients 102a ... 102n are isolated from the server 100 via the firewall 104. The trusted administrative client 110 provides addressing information of the clients 102a ... 102n to the server 100.

Figure 2:
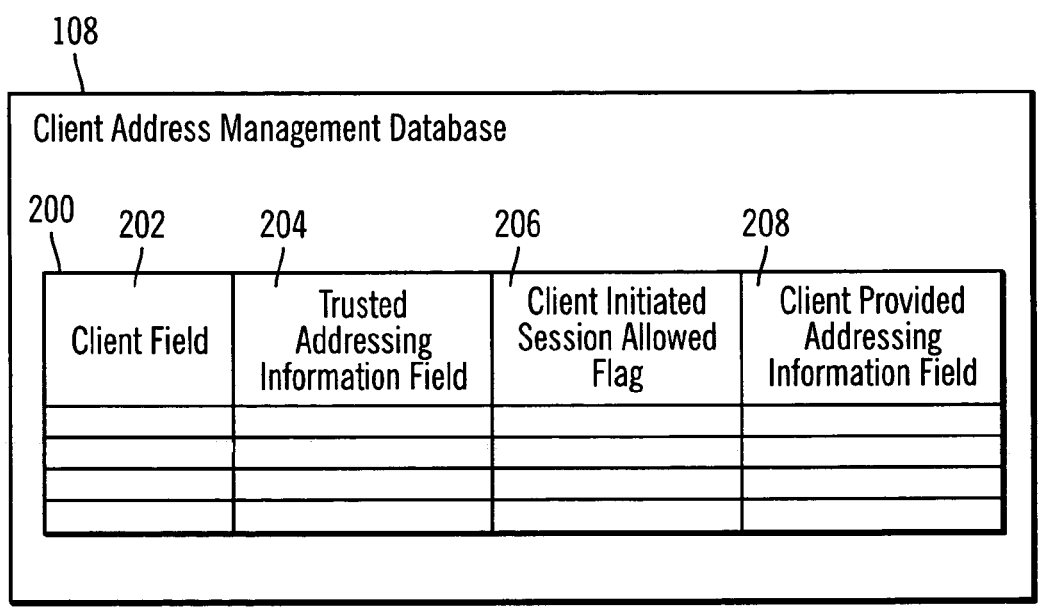
FIG. 2 illustrates a client address management database implemented in the server, in accordance with certain embodiments.

FIG. 2 illustrates data structures related to the client address management database 108 implemented in the server 100, in accordance with certain embodiments. While FIG. 2 illustrates that the client address management database 108 is structured in the form of a table 200, in alternative embodiments other data structures that are different from the table 200 may be used to implement the client address management database 108.

In certain embodiments, the table 200 of the client address management database 108 includes entries corresponding to a client field 202, a trusted addressing information field 204 and a client initiated session allowed flag 206, and a client provided addressing information field 208.

The client field 202 entries of the table 200 may be populated by references to the clients 102a ... 102n, i.e., the client field 202 entries may have a correspondence to the clients 102a ... 102n.

The trusted addressing information field 204 entries of the table 200 may be populated with the addressing information of the clients 102a ... 102n, where the populating of the addressing information may be performed by the trusted administrative client 110. The addressing information of the clients 102a ... 102n stored in the trusted addressing information field 202 entries may include the IP addresses of the clients 102a ... 102n, where the IP addresses may be used by the server 100 to establish sessions with the clients 102a ... 102n. Alternative embodiments may use other addressing information besides IP addresses. For example, built-in hardware addresses, such as, Media Access Control (MAC) addresses of devices may be used as the addressing information.

The client initiated session allowed flag 206 entries of the table 200 may be populated with Boolean indicators by the trusted administrative client 110. The client provided addressing information field 208 entries of the table 200 may be populated by addressing information provided by corresponding clients. If the Boolean indicator in a client initiated session allowed flag 206 entry is false, then the trusted addressing information field 204 entry is used by the server 100 to contact the corresponding client. If the Boolean indicator in a client initiated session allowed flag 206 entry is true, then the client provided addressing information field 208 entry is used by the server 100 to contact the corresponding client.

Therefore, FIG. 2 illustrates an embodiment in which the client address management database 108 stores trusted addressing information corresponding to the clients 102a ... 102n. The client address management database 108 also stores information regarding the capability of clients 102a ... 102n to establish sessions with the server 100 via addressing information provided by the clients 102a ... 102n.

Figure 3:
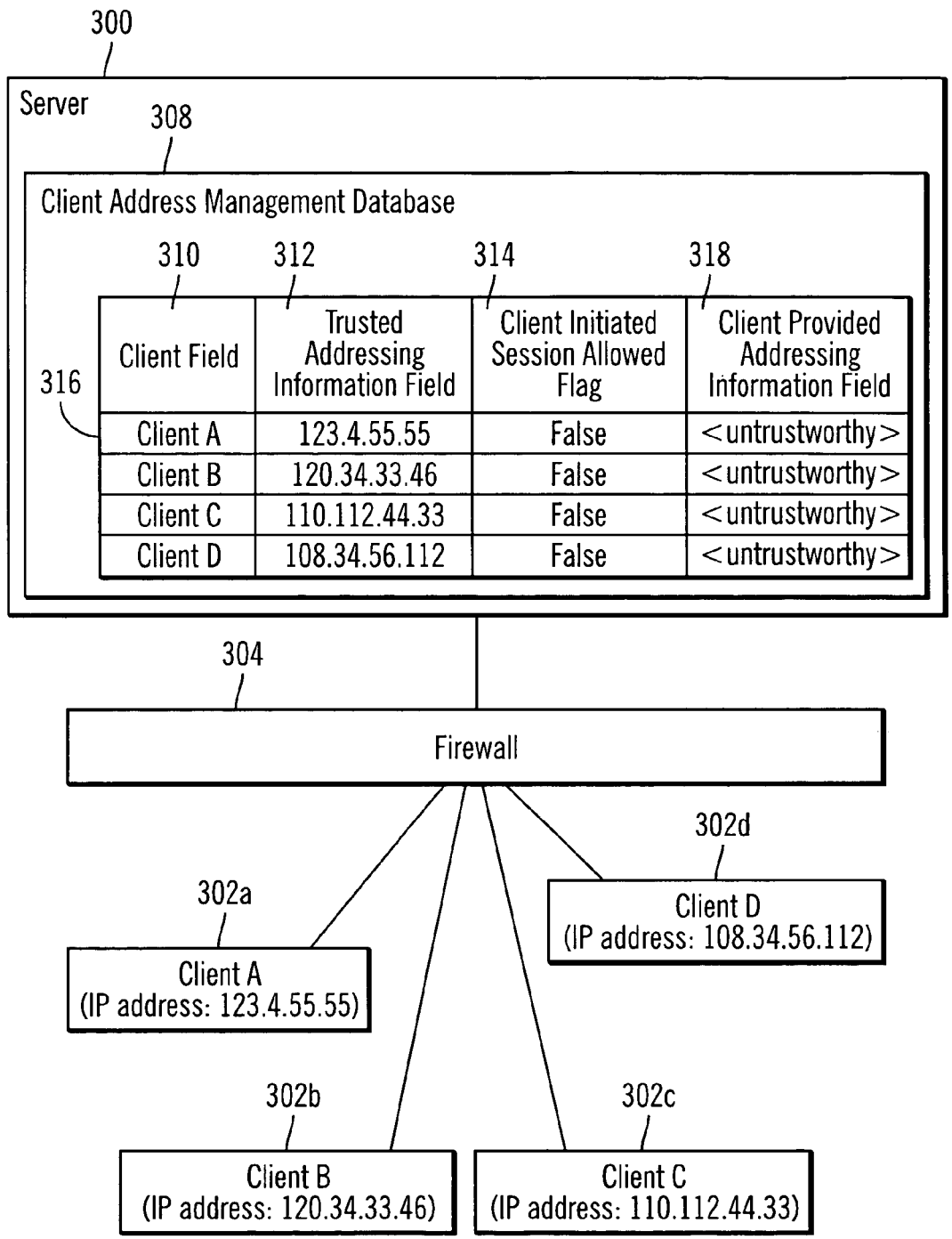
FIG. 3 illustrates exemplary entries in the client address management database, in accordance with certain embodiments.

FIG. 3 illustrates exemplary entries in a client address management database 308 that may be implemented in a server 300. In certain embodiments, the server 300 may correspond to the server 100, and the client address management database 308 may correspond to the client address management database 108.

The server 300 is separated from four clients, client A 302a, client B 302b, client C 302c, and client D 302d via a firewall 304. FIG. 3 illustrates the IP addresses of each of the four clients 302a, 302b, 302c, 302d. For example, the IP address of client A is 123.4.55.55 and the IP address of client D is 108.34.56.112.

The entries corresponding to columns 310, 312, 314 of the table in the client address management database 308 are populated by the trusted administrative client 110. For example, in certain embodiments, the entries corresponding to row 316 of client address management database 308, may include client A in the client field 310 entry, the IP address of client A, i.e., 123.4.55.55 in the trusted addressing information field 312 entry and the Boolean indicator "False" as the client initiated session allowed flag 314 entry. Therefore, row 316 indicates that the server 300 may only establish a session with client A 302a by establishing a session with the IP address 123.4.55.55 of client A 302a, where the IP address 123.4.55.55 is the trusted addressing information of client A 302a, and where the trusted addressing information is provided to the client address management database 308 by the trusted administrative client 110. Entries corresponding to columns 310, 312, 314 of the other rows of the table in the client address management database 308 are also populated appropriately by the trusted administrative client 110. In the example provided in FIG. 3, the actual entries of the client provided addressing information field 318 entries are not shown. Instead, the client provided addressing information field 318 entries are indicated as "untrustworthy" because the client initiated session allowed flag 314 entries are all false.

Therefore, FIG. 3 illustrates exemplary entries in the client address management database 308, where the entries are populated by the trusted administrative client 110.

Figure 4:
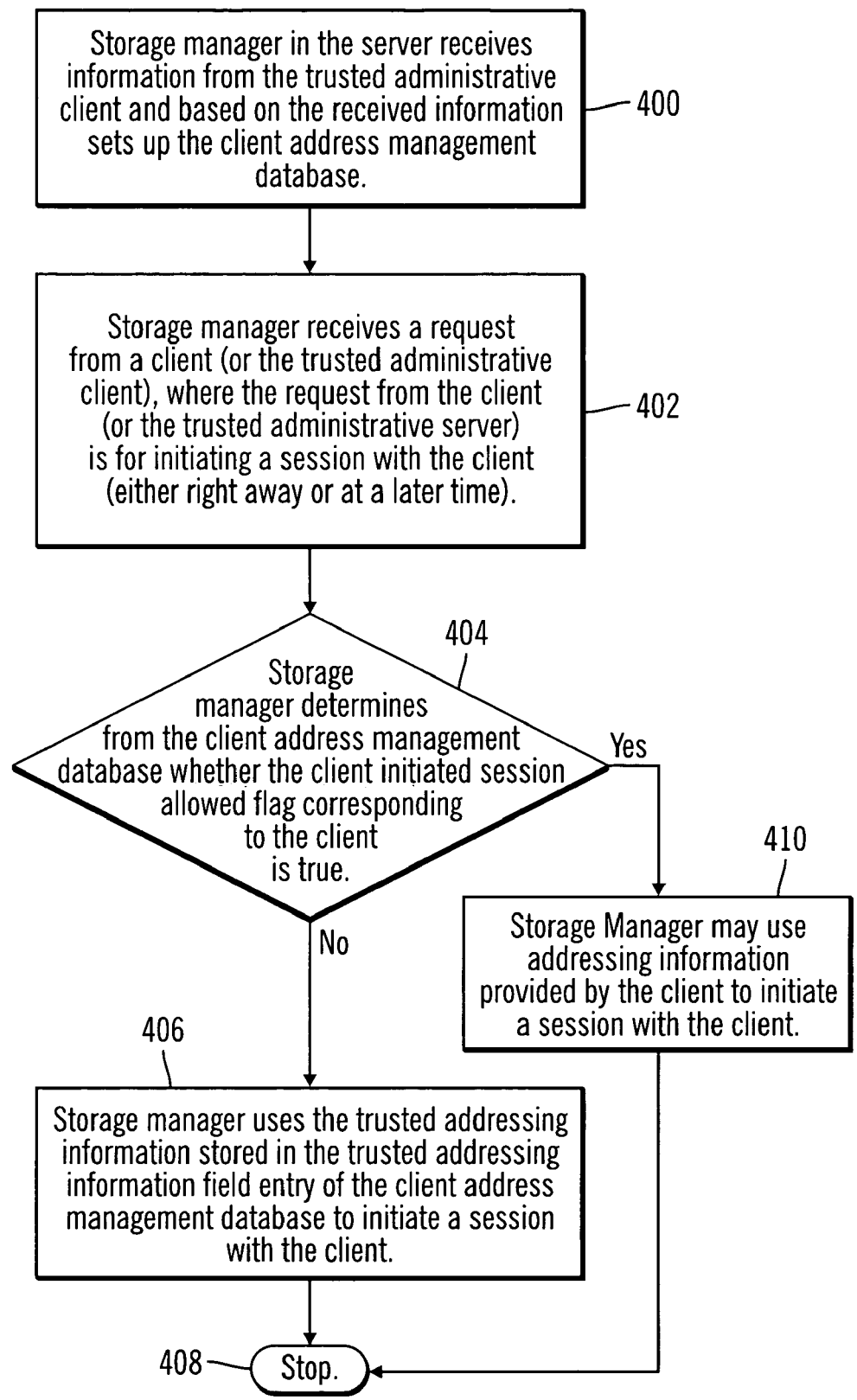
FIG. 4 illustrates logic for controlling client access, in accordance with certain embodiments.

FIG. 4 illustrates logic for controlling client access implemented in the server 100, in accordance with certain embodiments. In certain embodiments, the logic may be implemented in the storage manager 106. In other embodiments, the logic many be implemented, either completely or partially, in an application that is different from the storage manager 106.

Control starts at block 400, where the storage manager 106 in the server 100 receives information from the trusted administrative client 110, and based on the received information sets up the client address management database 108. After the client address management database 108 is set up, the client address management database 108 may include the trusted addressing information corresponding to the clients 102a ... 102n. In certain embodiments, trusted addressing information corresponding to the clients 102a ... 102n is known to the trusted administrative client 110 during configuration of the storage manager 106 and/or the clients 102a ... 102n.

The storage manager 106 receives (at block 402) a request from a client, such as the client 102a, or the trusted administrative client 110 where the request is for initiating a session. In certain embodiments the request from the client 102a or the trusted administrative client 110 is for establishing the session substantially immediately, whereas in other embodiments the request from the client 102a or the trusted administrative client 110 indicates that the client 102a is ready to perform a task and the server 100 should establish a session with the client 102a at a time to be determined by the server 100.

The storage manager 106 determines (at block 404) from the client address management database 108 whether the client initiated session allowed flag 206 entry corresponding to the client 102a is true.

If the storage manager 106 determines (at block 404) from the client address management database 108 that the client initiated session allowed flag 206 entry corresponding to the client 102a is not true, then the storage manager 106 uses the trusted addressing information stored in the trusted addressing information field 204 entry corresponding to the client 102a to initiate (at block 406) a session with the client 102a and control stops (at block 408).

If the storage manager 106 determines (at block 404) from the client address management database 108 that the client initiated session allowed flag 206 entry corresponding to the client 102a is true, then the storage manager 106 may use addressing information provided by the client 102a to initiate (at block 410) a session with the client 102a, and control stops (at block 408). In certain embodiments, the addressing information provided by the client 102a may be stored in the client provided addressing information field 208, 318.

Therefore, FIG. 4 illustrates an embodiment in which the storage manager 106 uses trusted addressing information provided by the trusted administrative client 110 to establish sessions between the server 100 and the clients 102a . . . 102n, where the firewall 104 isolates the server 100 from the clients 102a . . . 102n.

Certain embodiments allow the server 100 to be isolated from the clients 102a . . . 102n via the firewall 104. The firewall 104 can prevent the clients 102a . . . 102n from initiating sessions with the server 100 that is behind the firewall. Certain embodiments allow the clients 102a . . . 102n to access applications, such as, the storage manager 106 that are implemented in the server 100, where the server 100 is behind the firewall 104.

In certain embodiments, the storage manager 106 is able to accommodate clients that are unconditionally allowed to start sessions with the server 100 as well as clients that are not allowed to start sessions with the server 100. A client may change from one state to another through configuration operations that are initiated by the server 100. The server 100 is able to contact clients 102a . . . 102n reliably without using client provided information, where the client provided information may be untrustworthy.

The storage manager 106 provides a mechanism for maintaining information that is used for server-initiated sessions that are separate from the information used in client initiated sessions (including server-prompted and client polling mechanisms). If a client's attributes are changed from client-initiated sessions allowed to client-initiated sessions prohibited, then the server 100 may switch from using client provided addressing information to trusted addressing information that is provided to the server 100 by the trusted administrative client 110.

Certain embodiments prevent compromised clients from spoofing addresses to the server 100 and prevent sessions from being rerouted to an unintended destination. Client provided addressing information in the server 100 is ignored when the server 100 needs to contact a client that is prohibited from initiating sessions. Certain embodiments may be used to implement server-initiated central scheduling of sessions through a firewall, where the firewall protects the server from the clients with which the sessions are established.

Additional Embodiment Details

The described techniques may be implemented as a method, apparatus or article of manufacture involving software, firmware, micro-code, hardware and/or any combination thereof. The term "article of manufacture" as used herein refers to program instructions, code and/or logic implemented in circuitry (e.g., an integrated circuit chip, Programmable Gate Array (PGA), ASIC, etc.) and/or a computer readable medium (e.g., magnetic storage medium, such as hard disk drive, floppy disk, tape), optical storage (e.g., CD-ROM, DVD-ROM, optical disk, etc.), volatile and non-volatile memory device (e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.). Code in the computer readable medium may be accessed and executed by a machine, such as, a processor. In certain embodiments, the code in which embodiments are made may further be accessible through a transmission medium or from a file server via a network. In such cases, the article of manufacture in which the code is implemented may comprise a transmission medium, such as a network transmission line, wireless transmission media, signals propagating through space, radio waves, infrared signals, etc. Of course, those skilled in the art will recognize that many modifications may be made without departing from the scope of the embodiments, and that the article of manufacture may comprise any information bearing medium known in the art. For example, the article of manufacture comprises a storage medium having stored therein instructions that when executed by a machine results in operations being performed.

Figure 5:
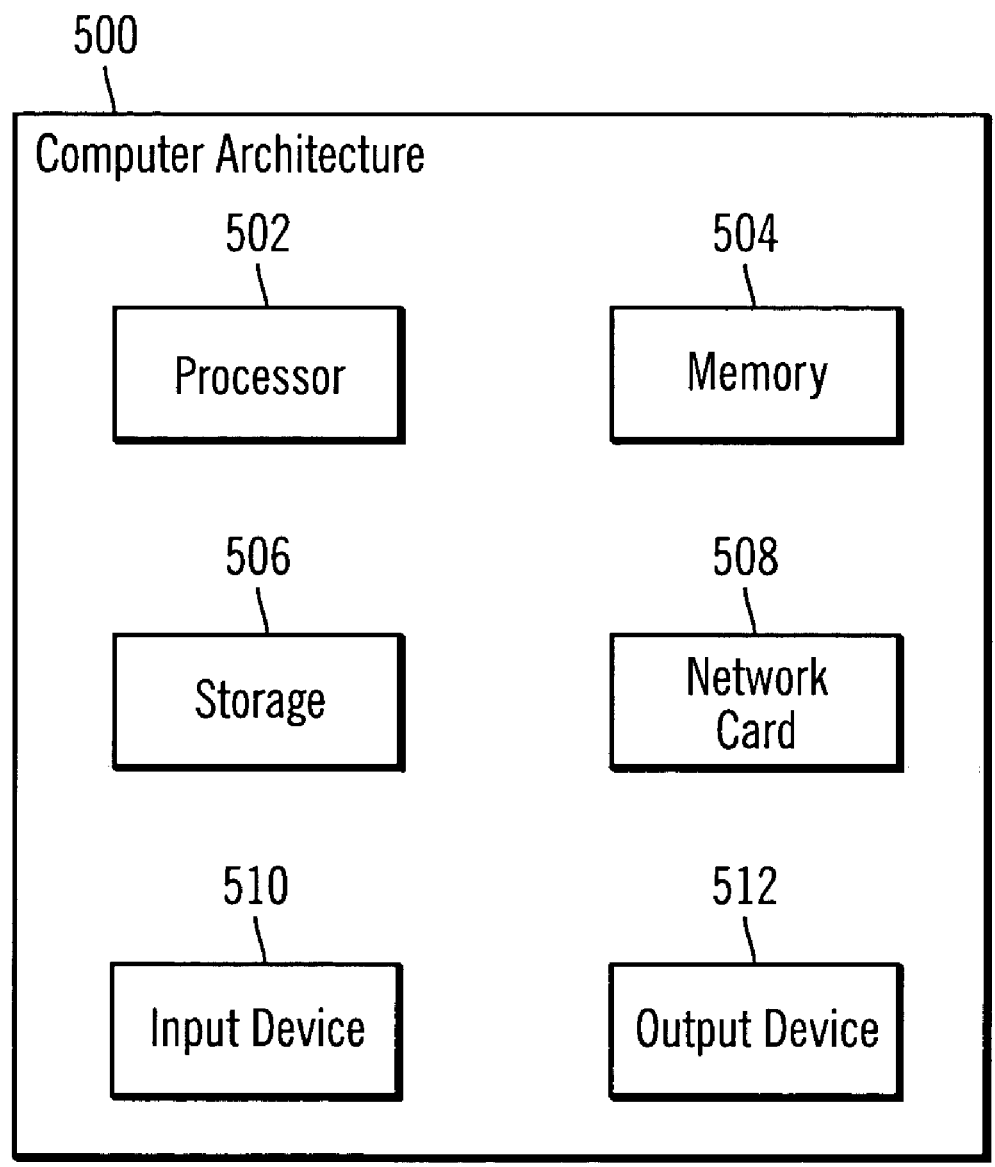
FIG. 5 illustrates a computing architecture in which certain embodiments are implemented.

FIG. 5 illustrates a block diagram of a computer architecture 500 in which certain embodiments may be implemented. FIG. 5 illustrates one embodiment of the server 100, the trusted administrative client 100, and the clients 102a . . . 102n. The server 100, the trusted administrative client 100, and the clients 102a . . . 102n may implement the computer architecture 500 having a processor 502, a memory 504 (e.g., a volatile memory device), and storage 506. Certain elements of the computer architecture 500 may or may not be found in the server 100, the trusted administrative client 110, and the clients 102a . . . 102n. The storage 506 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 506 may comprise an internal storage device, an attached storage device and/or a network accessible storage device. Programs in the storage 506 may be loaded into the memory 504 and executed by the processor 502. Additionally, the architecture may include a network card 508 to enable communication with a network. The architecture may also include at least one input device 510, such as, a keyboard, a touchscreen, a pen, voice-activated input, etc., and at least one output device 512, such as a display device, a speaker, a printer, etc.

At least certain of the operations of FIG. 4 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-5 are described as having specific types of information. In alternative embodiments, the data structures and components may be structured differently and have fewer, more or different fields or different functions than those shown or referred to in the figures.

Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method, comprising:
   receiving a request, from a client, to initiate a session, wherein the client provides an addressing information for initiating the session;
   determining whether the session should be initiated with the addressing information provided by the client; and
   initiating the session with trusted addressing information corresponding to the client, in response to determining that the session should not be initiated with the addressing information provided by the client, wherein the trusted addressing information is stored in a data structure, and wherein the data structure includes for a plurality of clients whether each client of the plurality of clients is allowed to initiate sessions with client provided addressing information.

2. The method of claim 1, wherein receiving the request, determining whether the session should be initiated, and initiating the session are performed by a storage manager implemented in a server from which the client is separated by a firewall.

3. The method of claim 2, wherein the firewall prevents the client from initiating the session with the sewer.

4. The method of claim 1, wherein the request indicates to a server that the client is ready to perform a task, and that the sewer should initiate the session with the client.

5. The method of claim 1, further comprising:
   receiving the trusted addressing information corresponding to the client from a trusted administrative client, prior to receiving the request to initiate the session.

6. The method of claim 1, further comprising:
   initiating the session with the addressing information provided by the client, in response to determining that the session should be initiated with the addressing information provided by the client.

7. The method of claim 1, wherein the trusted addressing information includes the Internet Protocol Address of the client.

8. The method of claim 1, wherein a firewall prevents the client from initiating the session with a server, and wherein the server is required to allow access to the client across the firewall.

* * * * *